United States Patent [19]

Okutani

[11] Patent Number: 5,051,692
[45] Date of Patent: Sep. 24, 1991

[54] PROCESSING APPARATUS FOR MEASURING THE SPEED OF A ROTATING BODY

[75] Inventor: Norio Okutani, Neyagawa, Japan

[73] Assignee: Matsushita Electric Industrial Co., Ltd., Osaka, Japan

[21] Appl. No.: 389,439

[22] Filed: Aug. 4, 1989

[30] Foreign Application Priority Data

Aug. 8, 1988 [JP] Japan .................. 63-197425

[51] Int. Cl.$^5$ .................................................. G01P 3/36
[52] U.S. Cl. .................................................. 324/175
[58] Field of Search ............... 324/160, 166, 173, 175, 324/174, 178, 207.11; 356/27, 28

[56] References Cited

U.S. PATENT DOCUMENTS

| 3,824,015 | 7/1974  | Petit et al.       | 324/175 X |
| 3,912,926 | 10/1975 | Coulbourn          | 324/175 X |
| 3,995,156 | 11/1975 | Angersbach et al.  | 324/175 X |
| 4,031,466 | 6/1977  | Krause et al.      | 324/175   |
| 4,158,172 | 6/1979  | Boyer et al.       | 324/175 X |
| 4,445,087 | 4/1984  | Mehnert            | 324/175   |
| 4,502,045 | 2/1985  | Fromm              | 324/175 X |
| 4,717,824 | 1/1988  | Sakamoto et al.    | 324/175 X |
| 4,880,966 | 11/1989 | Goodrich et al.    | 324/175 X |

Primary Examiner—Kenneth Wieder
Assistant Examiner—Warren S. Edmonds
Attorney, Agent, or Firm—Panitch Schwarze Jacobs & Nadel

[57] ABSTRACT

A speed detecting apparatus including an encoder for generating detection signals of different phases, a scanning device for scanning said detection signals to output a scanned detection signal, and a period detecting device for detecting the period of said scanned detection signal.

5 Claims, 4 Drawing Sheets

PROCESSING APPARATUS FOR MEASURING THE SPEED OF A ROTATING BODY

BACKGROUND OF THE INVENTION

1. Field of the Invention

This invention relates to a speed detecting apparatus, and more particularly to a speed detecting apparatus which can detect the speed of a body which is moving at low speed.

2. Description of the Prior Art

In many fields, a speed detecting apparatus is employed to detect the speed of a moving body which moves linearly, curvedly or rotatively. Hereinafter, description will be made using a rotating body as a typical example of a moving body. It is usual to use a tacho-generator or an encoder in the detection of the speed of a rotating body.

When an encoder is used in a speed detecting apparatus, a signal output from the encoder is subjected to a frequency-speed conversion to detect the speed of a moving body. In other words, the speed of a moving body is detected on the basis of the number of pulses output from the encoder within a predetermined period of time. The applicant has proposed a speed detecting apparatus in which a pulse signal output from an encoder is divided and the time intervals of the divided signals are detected by the use of a reference clock signal so that the detected period of the pulse signal is used to determine the speed of a moving body.

When a rotating body is servo-controlled to rotate at a predetermined speed which is very low, for example, one rotation per several tens of seconds or several minutes, or one rotation per day, the rotational speed of the rotating body must be detected with accuracy at short-time intervals. It is substantially impossible for a tacho-generator to detect such a very low speed with accuracy.

In the frequency-speed conversion of a signal obtained from a body rotating at such a very low speed, the number of output pulses per unit time is extremely small. Even when an encoder with a high resolution is used, therefore, it is almost impossible to detect a speed with accuracy at a predetermined time interval.

In above-mentioned our prior apparatus, a speed is detected at time intervals each corresponding to one period, that is, at the period of the pulse signal output from an encoder. Therefore, when the speed is maintained at a certain level during a short period of time and the signal output from a detecting element has a substantially sinusoidal waveform as shown in FIG. 7, the our prior apparatus can detect the speed within one period H with accuracy. When the speed frequently changes during a short period of time, the signal output from the detecting element has a waveform shown in FIG. 8. Thus, the our prior apparatus can detect the average speed in one period H, but cannot detect the actual speed at each moment, resulting in that the rotating body cannot be servo-controlled to rotate at the predetermined speed.

In a speed detecting apparatus of the invention, detection signals of different phases are scanned to be output as a scanned detection signal having periodicity. When a moving body is stopped, the period of the scanned detection signal is the same as that of the scanning period. When a moving body moves in the phase-leading direction, the period of the scanned detection signal is lengthened by the extent which is offset by the movement in the phase-leading direction. When a moving body moves in the direction reverse to the phase-leading direction, the period of the scanned detection signal is shortened. The speed of the moving body can be detected on the basis of the data including the period of the scanned detection signal, the scanning period, and the distance which the moving body moves in a single period of the phase. Thus, the speed can be detected at each period of the scanned detection signal determined by the scanning period, resulting in that the speed of the moving body can be detected even when it moves at a low speed.

When the scanning period is set short, the detection interval becomes short so that the rapid response of detection is realized and that the detection range becomes large. In this case, however, the accuracy and resolution of the speed detection are relatively poor. On the other hand, when the scanning period is set long, the speed detection is relatively poor in the response and the detection range, but is excellent in resolution.

According to the invention, the scanned detection signal is divided so that the speed can be detected at a desired detection interval. It is selectable whether the detection period is set long to perform the speed detection with high accuracy or it is set short to perform speed detection with excellent response characteristics.

SUMMARY OF THE INVENTION

The speed detecting apparatus of this invention, which overcomes the above-discussed and numerous other disadvantages and deficiencies of the prior art, comprises an encoder for generating for scanning said detection signals to output a scanned detection signal; and a period detecting means for detecting the period of said scanned detection signal.

In a preferred embodiment, the scanning means comprises a switching means for scanning said detection signals.

In a preferred embodiment, the apparatus further comprises a frequency-dividing means for dividing said scanned detection signal, the period of the signal output from said frequency-dividing means is detected.

In a preferred embodiment, the encoder comprises: a light-emitting element; a code disc mounted to a moving body and provided with a plurality of slits periodically formed thereon, through which the light emitted from said light-emitting element passes; a mask provided with a plurality of slits slanted with respect to said slits of said code disc; and a plurality of photo-detecting elements which output detected signals corresponding to the amount of said light having passed through said slits of said mask, said detection signals being composed of said detected signals in different phases and signals obtained by inverting said detected signals.

In a preferred embodiment, the moving speed is obtained by calculating the speed difference of $V_x$-$V_o$, in which said $V_o$ represents the moving speed of said code disc at the time when the period of said detection signal obtained by the rotation of the code disc without scanning is equal to the period corresponding to the scanning frequency, and said $V_x$ represents the moving speed of said code disc corresponding to the period of said scanned detection signal obtained by scanning said detection signals at said scanning frequency.

A speed detecting apparatus of this invention comprises an encoder for generating a plurality of detection signals of different phases; a switching means for sequentially scanning said detection signals at the frequency of a predetermined scanning period to output a scanned detection signal; a signal processing circuit for producing a periodic signal from said scanned detection signal, said periodic signal being a pulse signal generated at each period of said scanned detection signal; a frequency-dividing means for dividing said periodic signal; a timing circuit connected to each $2^n$-division (n is an integer) output terminals of said frequency-dividing means via a selecting means which selects one of said output terminals; a counter which counts reference clock signals output from a reference clock generating circuit and which is reset by a set signal output from said timing circuit; a latch circuit which latches the output of said counter just before the resetting in accordance with a command given by said timing circuit; and a calculating means for calculating the speed from the period of said divided periodic signal, the dividing rate selected by said selecting means, and the scanning period of said switching means.

Thus, the invention described herein makes possible the objectives of (1) providing a speed detecting apparatus which can detect the speed of a moving body which moves at low speed, with high accuracy;

(2) providing a speed detecting apparatus which can detect the speed of a moving body which moves at low speed, with rapid response; and (3) providing a speed detecting apparatus which can detect the speed of a moving body which moves at low speed, with either high accuracy or rapid response.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

A speed detecting apparatus according to the invention will be described with reference to FIGS. 1 to 6.

Figure 2:
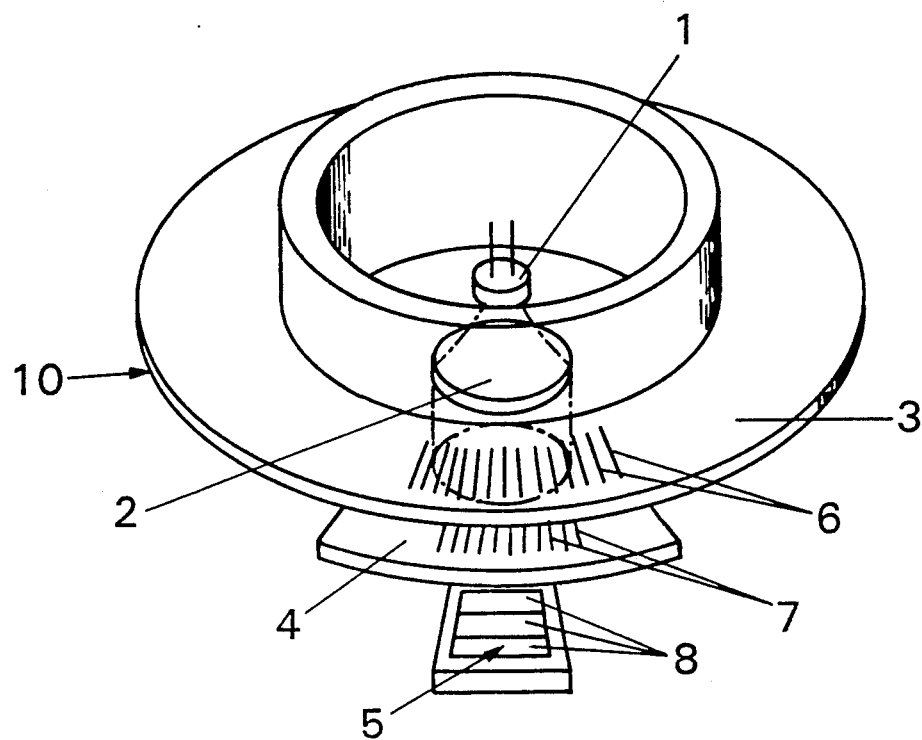
FIG. 2 shows an encoder used in the embodiment of FIG. 1.

A preferred embodiment of the invention comprises an encoder shown in FIG. 2. The encoder 10 is provided with a laser diode 1. Laser light emitted from the light-emitting face of the laser diode 1 is formed into parallel beams of coherent light by a collimator lens 2 so as to irradiate a code disc 3. Along the peripheral portion of the code disc 3, 32,400 slits 6 through which the laser light passes to illuminate a mask 4 are periodically formed. The mask 4 is provided at the portion corresponding to the slits 6 with a plurality of slits 7 which are slanted with respect to the slits 6 so that the light also passes through the slits 7 to irradiate a photo-detector 5. On the photodetector 5, a plurality of photo-detecting elements 8 each of which outputs a detection signal corresponding to the amount of incident light are arranged in the longitudinal direction of the slits 7. Each photo-detecting element 8 is so disposed that moire stripes which formed thereon in the longitudinal direction of the slits 7 by the light having passed through the slits 6 and 7 are detected in phases of 0°, 45°, 90° and 135°.

Figure 1:
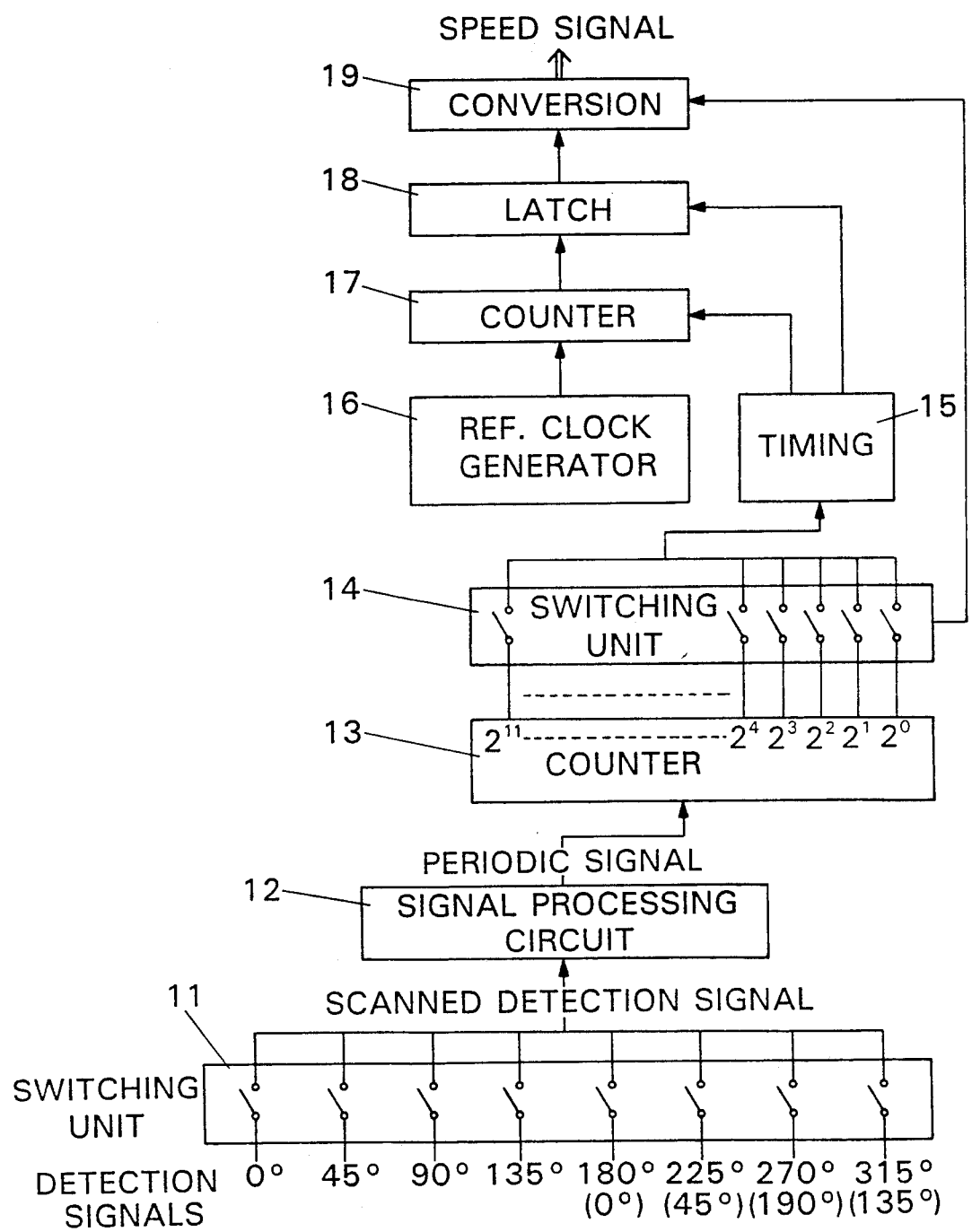
FIG. 1 is a block diagram for illustrating a preferred embodiment of the invention.

The detection signals of phases of 0°, 45°, 90° and 135° obtained by the photo-detecting elements 8 and signals of phases of 180°, 225°, 270° and 315° obtained by inverting the signals are input to a switching unit 11, as shown in FIG. 1. In the switching unit 11, the detection signals are sequentially scanned at the frequency of 3.24 kHz to obtain a scanned detection signal. The scanned detection signal is then input to a signal-processing circuit 12 which produces a periodic pulse signal. The period of the periodic pulse signal corresponds to that of the scanned detection signal.

The periodic pulse signal output from the signal-processing circuit 12 is supplied to a counter 13 which functions as a frequency-dividing means. Each output terminal of "division by $2^n$" (n=0, 1, . . . , 11) of the counter 13 is connected to a timing circuit 15 via a switching unit 14, so that a frequency-divided signal selected by the switching unit 14 is supplied to the timing circuit 15. The reference numeral 16 denotes a reference clock generating circuit which outputs a reference clock signal of high frequency to a counter 17. The counter 17 is reset by a set signal output from the timing circuit 15 at the rising of the frequency-divided signal. The output of the counter 17 produced just before it is reset is latched by a latch circuit 18 in accordance with a command given by the timing circuit 15, and then the signal output from the latch circuit 18 is input to a conversion circuit 19. The conversion circuit 19 calculates the speed from the latched output of the counter 17 (i.e., the period of the frequency-divided signal generated by properly dividing the periodic signal obtained from the scanned detection signal), the information of the dividing rate selected by the switching unit 14, and the scanning period of the switching unit 11, thereby outputting a speed signal.

The operation of the embodiment will be described in more detail. In the following description, it is assumed that the switching unit 14 selects the output terminal of "$2^0$" of the counter 13 so that the periodic pulse signal is not divided and input to the timing circuit 15. The detection signals of different phases which are detected when the code disc 3 moves at a fixed speed are assumed to have respective waveforms shown in FIG. 3.

Figure 3:
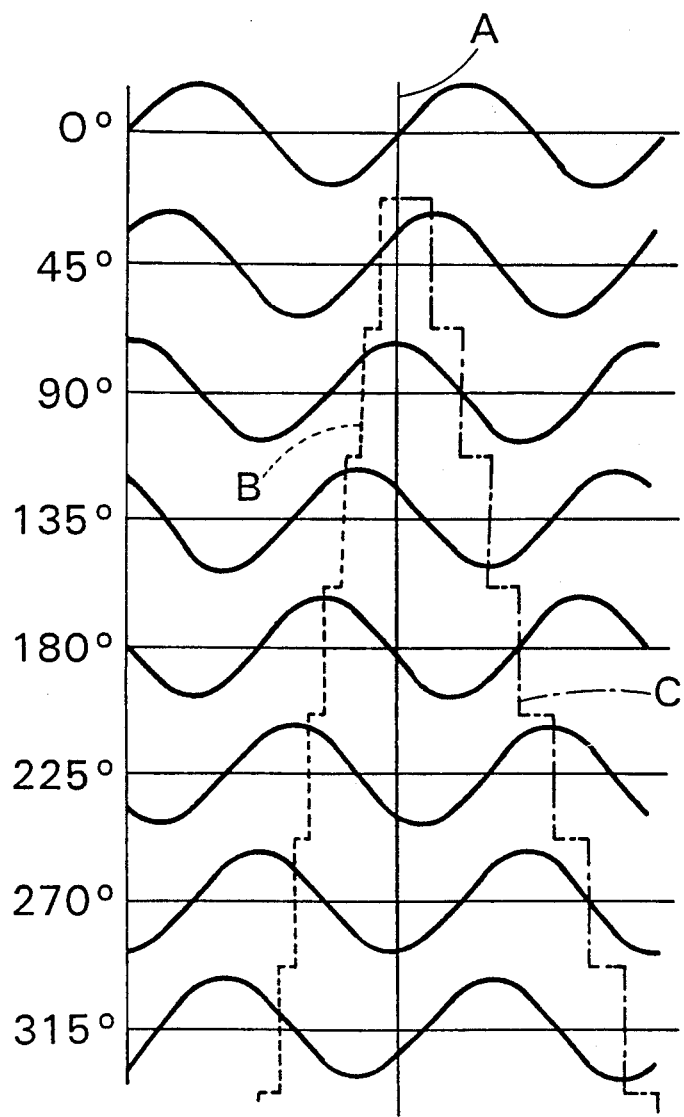
FIG. 3 shows waveforms of detection signals of various phases.

When the code disc 3 remains stationary, the scanned detection signal is obtained by scanning the detection signals of different phases by following the solid line A as shown in FIG. 3. The scanned detection signal in this case has the period of $T_o = 1/3240$ sec. which is the same as the scanning period, and the waveform shown by the solid line in FIG. 4.

When the code disc 3 moves in the same direction as the phase-leading direction of the detection signals, the code disc 3 moves during the scanning so as to offset the phase leading. In this case, the detection signals of the different phases are scanned following the broken line B shown in FIG. 3, resulting in generating a scanned detection signal having the waveform shown by the broken line in FIG. 4 and having the period $T_1$ which is longer than the period $T_o$.

Figure 4:
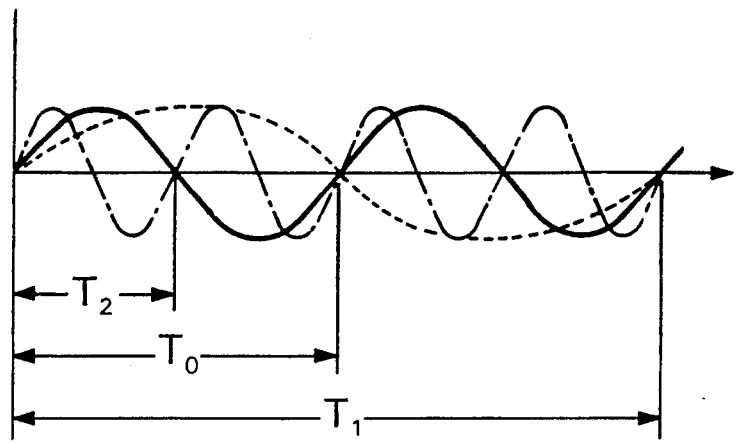
FIG. 4 shows waveforms of scanned detection signals obtained in various speeds.

When the code disc 3 moves in the opposite direction, the phase leading is further increased so that the detection signals of the different phases are scanned following the dash-dot line C in FIG. 3, resulting in generating a scanned detection signal having the waveform shown by the dash-dot line in FIG. 4, and the period $T_2$ which is shorter than the period $T_o$.

In this way, the moving direction and speed of the code disc 3 can be detected by detecting the period $T_x$ of the scanned detection signal and comparing it with the scanning period $T_o$.

Figure 5:
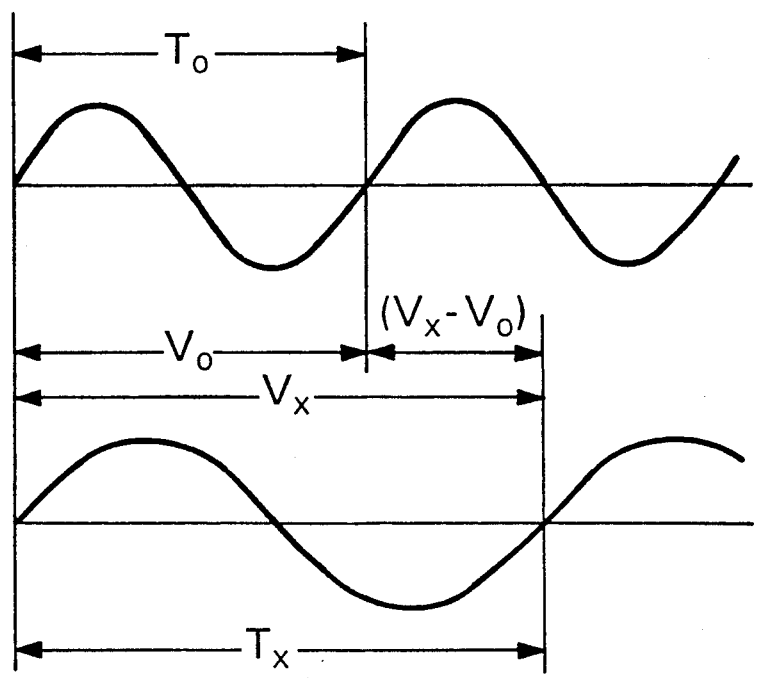
FIG. 5 is a waveform diagram for illustrating the principle of obtaining the speed.

The way of calculating the speed will be described with reference to FIG. 5. The moving speed of the code disc 3 when the period of the detection signal obtained by rotating the code disc 3 without scanning is equal to the period $T_o$ corresponding to the scanning frequency is represented by $V_o$. In the above-mentioned example, 32,400 slits 6 are formed along the peripheral portion of the code disc 3 and the detection signal having the frequency of 3.24 kHz is output. Therefore, the moving speed which corresponds to the rotational speed of one rotation per 10 sec. is represented by $V_o=0.1$ R/sec."

On the other hand, when the period of the scanned detection signal obtained by scanning with this scanning frequency is represented by $T_x$ and the moving speed of the code disc 3 corresponding to $T_x$ is represented by $V_x$, the actual moving speed of the code disc 3 is given by a speed difference "$V_x-V_o$". For example, when a scanned detection signal having a period which is twice as large as the scanning period $T_o$ is obtained, the moving speed $V_x$ becomes 0.05 R/sec., so that the actual speed of the code disc 3 is (0.05-0.1) R/sec. This shows that the code disc 3 rotates at the speed of 0.05 R/sec. in the negative direction (i.e., the same direction as the phase-leading direction). Conversely, when a scanned detection signal having a period which is half as large as the scanning period is obtained, the moving speed $V_x$ becomes 0.2 R/sec., and accordingly it can be seen that the code disc 3 rotates at a speed of 0.1 R/sec. in the direction opposite to the phase-leading direction.

The range of the speed which can be detected is from zero (the state in which the cord disc 3 remains stationary) to the speed corresponding to the scanning period in either direction. When the actual speed exceeds this range, a phase signal caused by the next slit during the scanning period is mixed so that the phase cannot be discriminated and the speed cannot be detected.

Figure 6:
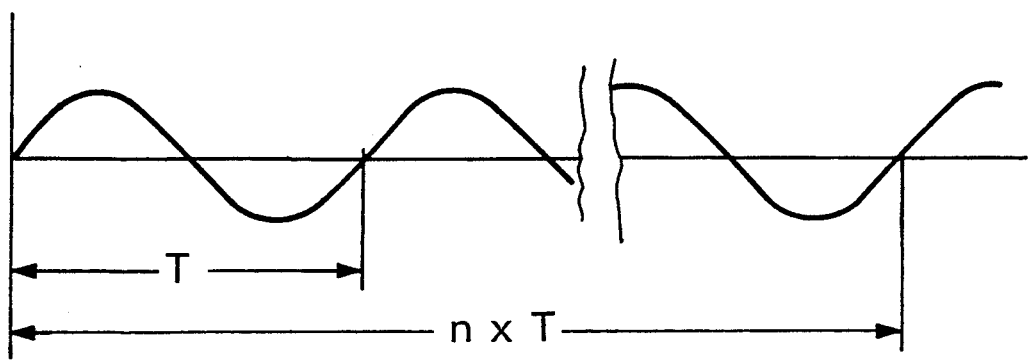
FIG. 6 is a waveform diagram for illustrating the division of the periodic signal.
Figure 7:
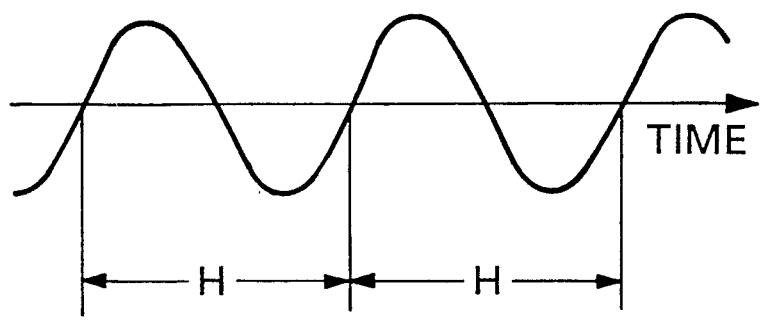
FIGS. 7 and 8 are waveform diagrams for illustrating the principle of detecting the speed in a conventional apparatus.
Figure 8:
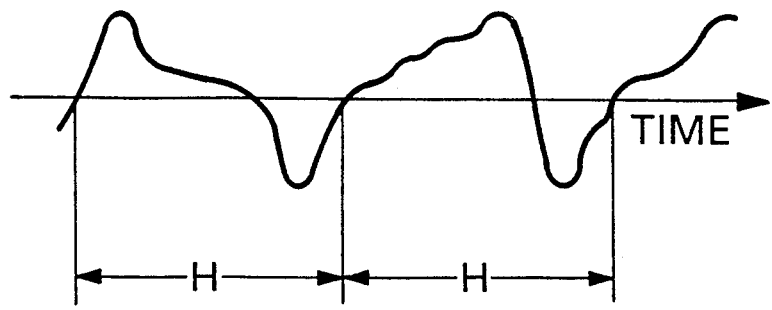

In the above description, the periodic signal obtained from the scanned detection signal is not divided and is used in the speed detection. Alternatively, the switching unit 14 is switched to select another terminal of the counter 13 so that a divided periodic signal is used as the frequency-divided signal to detect the speed at periodic intervals of n-cycles as shown in FIG. 6, resulting in more accurate detection of the speed. In this case, however, the time intervals for detecting the speed become longer so that the speed detection cannot attain rapid response. Thus, the speed detection using a non-divided periodic pulse signal is preferable when a rapid response is required rather than accuracy.

In the above-mentioned example, the detection signals obtained from a plurality of detecting elements are scanned by the switching unit 11 to obtain the scanned detection signal. Alternatively, the moire stripes may be scanned by a light beam so that the detection signal obtained by a single detecting element may serve as a scanned detection signal.

The counter 13 is used as the frequency-dividing means in the embodiment. Instead of the counter 13, a plurality of flip-flop circuits may be used.

The embodiment in which the code disc 3 is employed detects the rotation speed of a rotating body. An apparatus of the invention may also be applicable to the speed detection for linear movement.

As apparent from the above, in a speed detecting apparatus according to the invention, detection signals of different phases obtained by an encoder are scanned so as to output a periodic scanned detection signal, the period of which changes with the movement of a code disc of the encoder. The speed can be calculated from the period of the scanned detection signal, the scanning period, and the distance which the code disc moves in a single period of the phase. Thus, the speed can be detected at each period of the scanned detection signal determined by the scanning period, so that a low speed can be detected.

Moreover, in the apparatus of the invention, the scanned detection signal is divided so that the speed can be detected at any desired detection interval. Thus, when selecting the detection interval to be long, the speed can be detected with high accuracy, and, when selecting the detection interval to be short, the speed can be detected with high-speed response.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for measuring the speed of a rotating body comprising:
   an encoder for generating detection signals of different phases;
   a switching means for sequentially scanning said detection signals at the frequency of a predetermined scanning period and for periodically generating a scanned detection signal; and
   a period detecting means for detecting the period of said scanned detection signal.

2. An apparatus according to claim 1, further comprising a frequency-dividing means for dividing said periodic detection signal.

3. An apparatus according to claim 1, wherein said encoder comprises:
   a light-emitting element;
   a code disc mounted to a moving body and provided with a plurality of spaced slits extending throughout, through which light emitted from said light-emitting element passes;
   a mask provided with a plurality of slits corresponding in orientation with respect to said slits of said code disc through which light passing through said slits of said code disc passes;
   a plurality of photo-detecting elements which output detected signals corresponding to the amount of said light having passed through said slits of said mask; and said detection signals being composed of said detected signals in different phases and signals obtained by inverting said detected signals.

4. An apparatus according to claim 3, wherein the moving speed is obtained by calculating the speed difference of $V_x-V_o$, in which said $V_o$ represents the moving speed of said code disc at the time when the period of said detection signal obtained by the rotation of the code disc without scanning is equal to the period corresponding to the scanning frequency, with said period corresponding to the scanning frequency being obtained by scanning the detection signals of different phases when the code disc remains stationary and said $V_x$ represents the moving speed of said code disc corresponding to the period of said scanned detection signal.

5. A speed detecting apparatus comprising:
an encoder for generating a plurality of detection signals of different phases;
a switching means for sequentially scanning said detection signals at the frequency of a predetermined scanning period to output a scanned detection signal;
a signal processing circuit for producing a periodic signal from said scanned detection signal, said periodic signal being a pulse signal generated at each period of said scanned detection signal;
a frequency-dividing means for dividing said periodic signal;
a timing circuit connected to each $2^n$-division (n is an integer) output terminals of said frequency-dividing means via a selecting means which selects one of said output terminals;
a counter which counts reference clock signals output from a reference clock generating circuit and which is reset by a set signal output from said timing circuit;
a latch circuit which latches the output of said counter just before the resetting in accordance with a command given by said timing circuit; and
a calculating means for calculating the speed from the period of said divided periodic signal, the dividing rate selected by said selecting means, and the scanning period of said switching means.

* * * * *